United States Patent
Chang et al.

(10) Patent No.: US 11,375,823 B2
(45) Date of Patent: Jul. 5, 2022

(54) PUMP AND VALVE COMBINATION FOR BLADDER ADJUSTMENT

(71) Applicant: KOGE MICRO TECH CO., LTD., New Tapei (TW)

(72) Inventors: Chih Chang, New Taipei (TW); Qing-Xiang Xu, New Taipei (TW)

(73) Assignee: KOGE MICRO TECH CO., LTD., New Taipei (TW)

( * ) Notice: Subject to any disclaimer, the term of this patent is extended or adjusted under 35 U.S.C. 154(b) by 533 days.

(21) Appl. No.: 16/573,118

(22) Filed: Sep. 17, 2019

(65) Prior Publication Data
US 2020/0121094 A1   Apr. 23, 2020

(30) Foreign Application Priority Data

Oct. 19, 2018 (CN) .......................... 201811222378.0

(51) Int. Cl.
| | |
|---|---|
| *A47C 27/08* | (2006.01) |
| *F16K 31/02* | (2006.01) |
| *F16K 31/04* | (2006.01) |
| *A47C 7/46* | (2006.01) |
| *B60N 2/66* | (2006.01) |
| *F04B 45/047* | (2006.01) |
| *F16K 31/06* | (2006.01) |

(52) U.S. Cl.
CPC ............ *A47C 27/082* (2013.01); *A47C 7/467* (2013.01); *B60N 2/66* (2013.01); *B60N 2/665* (2015.04); *F04B 45/047* (2013.01); *F16K 31/02* (2013.01); *F16K 31/04* (2013.01); *F16K 31/0603* (2013.01)

(58) Field of Classification Search
CPC ........ A47C 27/082; A47C 7/467; B60N 2/66; B60N 2/665; F04B 45/047; F16K 31/02; F16K 31/04; F16K 31/0603
See application file for complete search history.

(56) References Cited

U.S. PATENT DOCUMENTS

| | | | | |
|---|---|---|---|---|
| 5,893,609 | A * | 4/1999 | Schmidt | ................. A47C 7/467 |
| | | | | 297/284.6 |
| 10,920,761 | B2 * | 2/2021 | Yin | ..................... F04B 39/0027 |

FOREIGN PATENT DOCUMENTS

WO         WO-0045673 A1 *   8/2000   ........... B60N 2/4415

* cited by examiner

*Primary Examiner* — Eric Keasel
(74) *Attorney, Agent, or Firm* — Juan Carlos A. Marquez; Marquez IP Law Office, PLLC

(57) ABSTRACT

A pump and valve combination for bladder adjustment is revealed and including a fluid supply member, a valve member and a bypass line. The fluid supply member includes a head end and a tail end. A bottom cover is disposed on the tail end and the fluid supply member provides fluid to the bottom cover through the tail end. The valve member is arranged at the head end and communicating with bladders. The valve member includes a valve cap fixed on the head end, a solenoid operated directional control valve, and an air supply tube. Two ends of the bypass line are connected to the bottom cover and an air input end of the air supply tube, respectively. An input portion and an output portion of the solenoid operated directional control valve are connected to an air output end of the air supply tube and the bladder respectively.

14 Claims, 8 Drawing Sheets

PUMP AND VALVE COMBINATION FOR BLADDER ADJUSTMENT

BACKGROUND OF THE INVENTION

1. Technical Field

The present invention relates to a pump and valve combination for bladder adjustment, especially to a pump and valve combination which uses fluid for adjustment of bladders. For example, the pump and valve combination can be applied to at least one part of seats, beds, etc.

2. Description of Related Art

For the comfort of users, seats available now are often provided with lumbar supports or adjustable supports for other areas of the body. For example, the backrest is provided with the lumbar support that forms a suitable support surface for supporting users' lumbar spine. The lumbar support can be a support based on components able to be moved mechanically or a support with at least one inflatable chamber with fluid therein. The inflatable chamber is provided with inflatable air cushions or bladders whose shape and size are adjustable along with the volume of the fluid therein.

The space in the seats available for installation of other parts is limited. Thus there is room for improvement and there is a need to provide a pump and valve combination in which a plurality of adjustable members is integrated into one piece for decreasing assembly cost and increasing seat comfort without occupying too much space while being mounted into the seat.

SUMMARY OF THE INVENTION

Therefore it is a primary object of the present invention to provide a pump and valve combination for bladder adjustment in which a plurality of adjustable members is integrated into one pump and valve combination so that space occupied is minimized and assembly cost is reduced.

The present invention provides a pump and valve combination for bladder adjustment comprising: a fluid supply member having a head end, a tail end opposite to the head end, a driving member including a motor fixed on the head end thereof and a transmission part, a bottom cover disposed on the tail end thereof, and a diaphragm member arranged between the bottom cover and the driving member while the transmission part driven by the motor further driving the diaphragm member so that fluid is pumped and delivered into the bottom cover by the diaphragm member; a valve member arranged at the head end of the fluid supply member and including a valve cap fixed on and connected to the head end of the fluid supply member, at least one solenoid operated directional control valve mounted in the valve cap, and at least one air supply tube mounted in the valve cap and communicating with a bladder; and a bypass line located on one side of the motor and one side of the diaphragm member and including one end thereof communicating with the bottom cover while the other end thereof is extended to the valve member; wherein one end of the motor is close to the valve member while the diaphragm member is on the other end of the motor, opposite to the valve member; the fluid pumped and delivered into the bottom cover by the diaphragm member passes through the bypass line to be supplied to the valve member; wherein the other end of the bypass line is communicating with an air input end of the air supply tube and an air output end of the air supply tube is connected to an input portion of the solenoid operated directional control valve while an output portion of the solenoid operated directional control valve is connected to the bladder.

Preferably, the pump and valve combination includes a pair of solenoid operated directional control valves and a pair of air supply tubes while the fluid supply member is provided with a pair of air supply ports.

Preferably, the valve cap includes at least one pipe hole through which the output portion of the solenoid operated directional control valve is exposed.

Preferably, the valve member further includes an electronic control part which is electrically connected to at least one solenoid directional control valve. The electronic control part is further electrically connected to the fluid supply member for control of the fluid supply member to supply gas to the valve member.

Preferably, the valve cap is further provided with an electrical interface while the electronic control part includes a terminal set which is located in the electrical interface.

Preferably, a stopping portion is formed around the air supply tube. The stopping portion is projecting from the air supply tube and arranged around the air supply port of the fluid supply member.

Preferably, at least one limiting slot is formed on the electronic control part for limiting the air supply tube therein. The stopping portion of the air supply tube is arranged between the limiting slot and the air supply port of the fluid supply member.

Preferably, the solenoid operated directional control valve is a two-way three-position directional control valve.

Preferably, the solenoid operated directional control valve further includes an adjustment outlet through which fluid in the bladder is discharged to the atmosphere.

Preferably, the adjustment outlet of the solenoid operated directional control valve is located in the valve cap.

Preferably, the pump and valve combination further includes a fluid adjustment member. The diaphragm member is located between the driving member and the fluid adjustment member. The fluid adjustment member is composed of a valve base, a valve and an overpressure adjustment member. The valve base controls the fluid flowing into a pump chamber of the diaphragm member in only one direction. The valve is set on one side of the valve base for control of the fluid to flow from the pump chamber of the diaphragm member into the overpressure adjustment member in a one-way manner. The overpressure adjustment member allows the fluid to flow through the middle of the valve and the middle of the valve base and return to the diaphragm member when the fluid pressure is too high.

Preferably, the valve base includes at least one upper adjustment hole, a plurality of fluid outlets and a plurality of check valves. The upper adjustment hole is located at the middle of the valve base and the fluid outlets are arranged around the upper adjustment hole while the check valves are located around the fluid outlets.

Preferably, the valve consists of at least one lower adjustment hole, a plurality of one-way valve pieces and a plurality of outer through holes. The lower adjustment hole, the one-way valve pieces, and the outer through holes are corresponding to the upper adjustment hole, the fluid outlets and the check valves respectively.

Preferably, at least one one-way valve plate extends from the periphery of the diaphragm member of the fluid supply member to the bypass line.

Implementation of the present invention at least produces the following advantageous effects: in the present pump and valve combination for bladder adjustment, the fluid supply member provides fluid to the bottom cover through the tail end thereof so that the driving member is getting closer to the electronic control part and the assembly is easier. Moreover, the fluid is more convenient to be released from the fluid supply member to the external environment outside the pump and valve combination through the tail end for pressure adjustment and relief when the fluid pressure is too high. A plurality of adjustable components is integrated into one piece. Thus not only space required for installation but also assembly cost is reduced.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
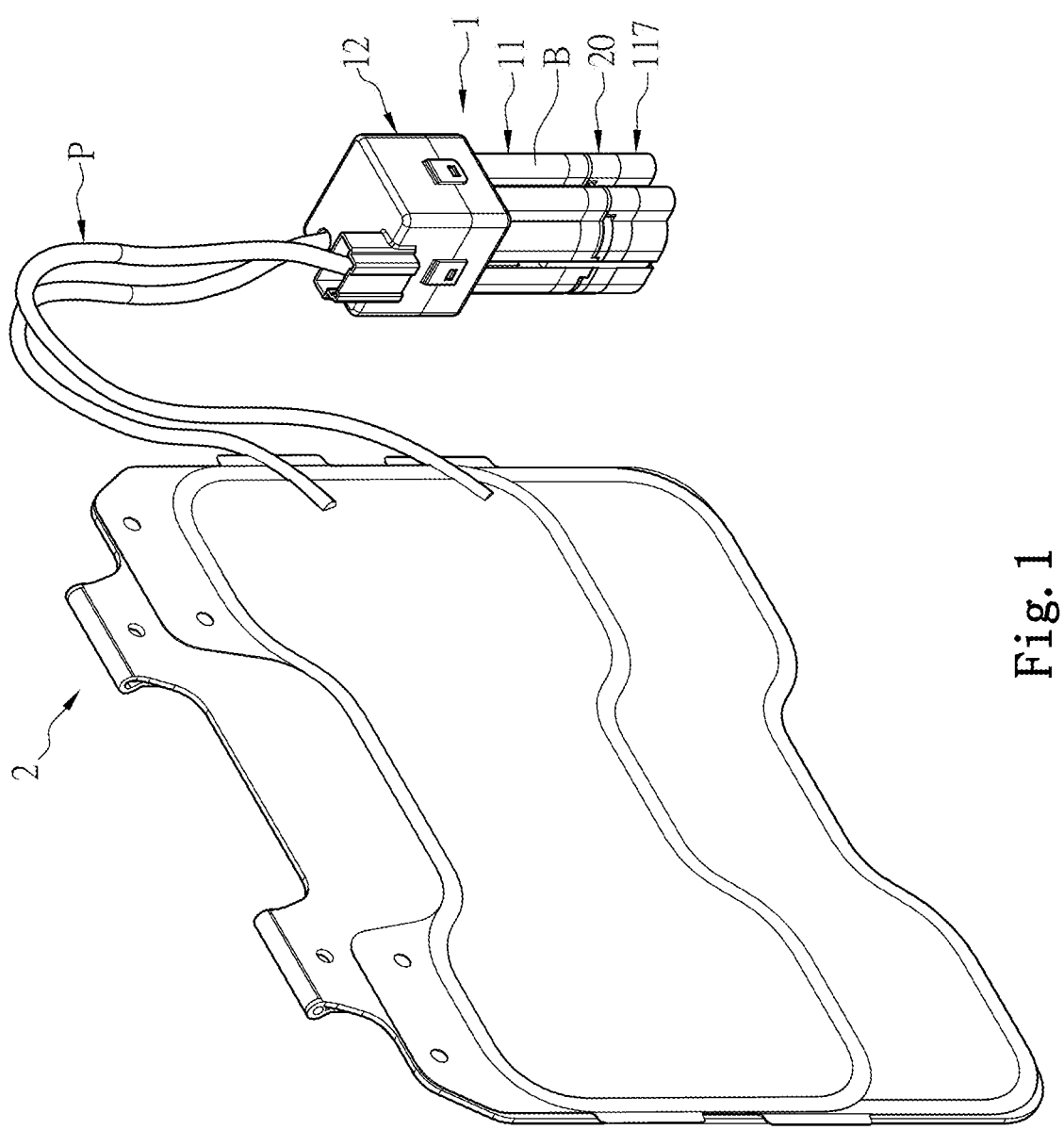
FIG. 1 is a perspective view of an embodiment of a pump and valve combination connected to bladders according to the present invention.

Refer to FIG. 1, a perspective view showing a pump and valve combination for adjustment of the present invention connected to bladders is revealed. A pump and valve combination 1 of the present invention is used for adjustment of the bladder 2 and further adjusting a backrest of vehicle seats. The bladder 2 can be arranged at the seat back for supporting user's lumber. The pump and valve combination 1 for bladder adjustment can also be arranged at massage chairs or beds for adjustment of chairs or beds.

Figure 2:
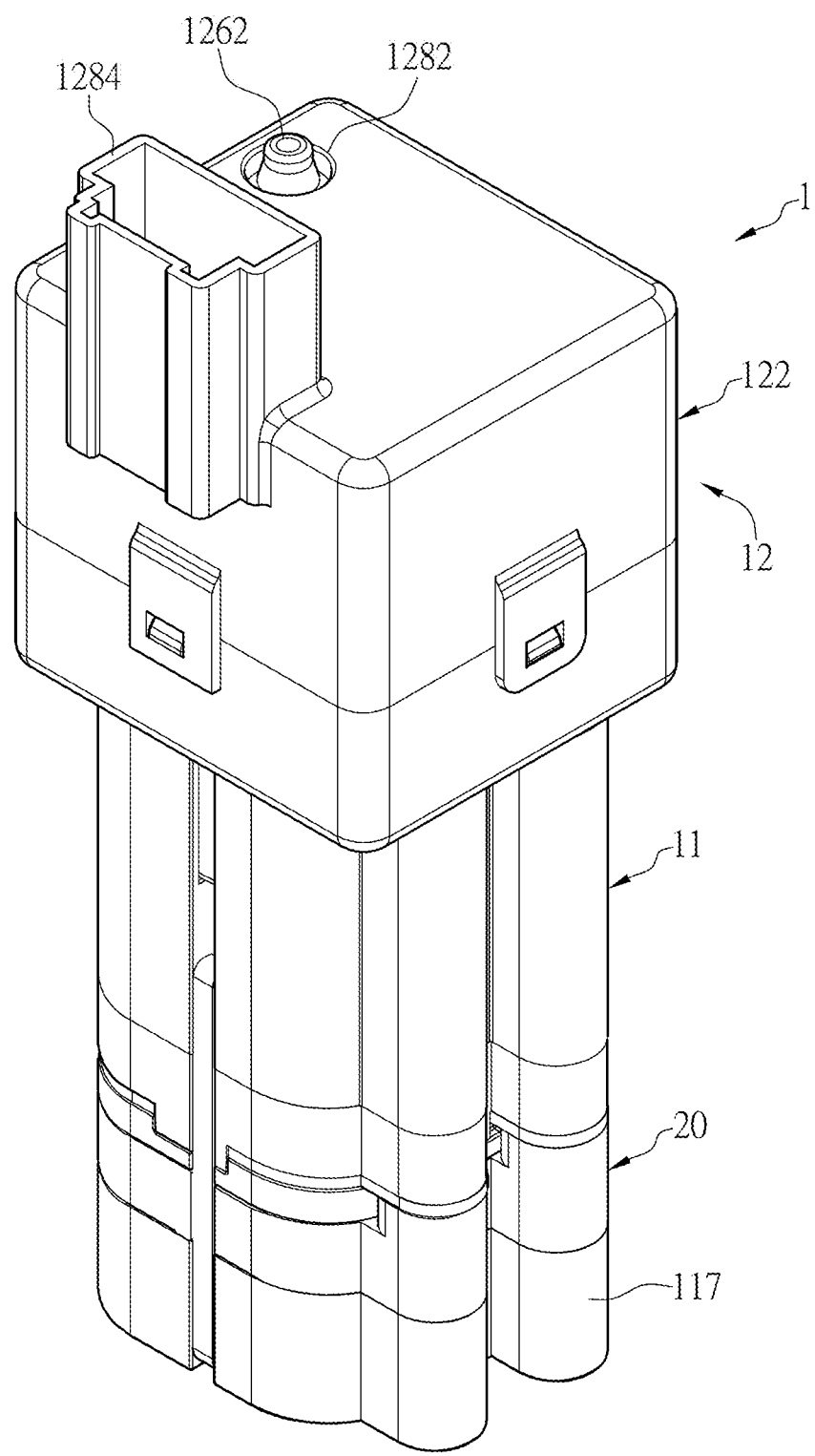
FIG. 2 is a perspective view of an embodiment of a pump and valve combination according to the present invention.
Figure 3:
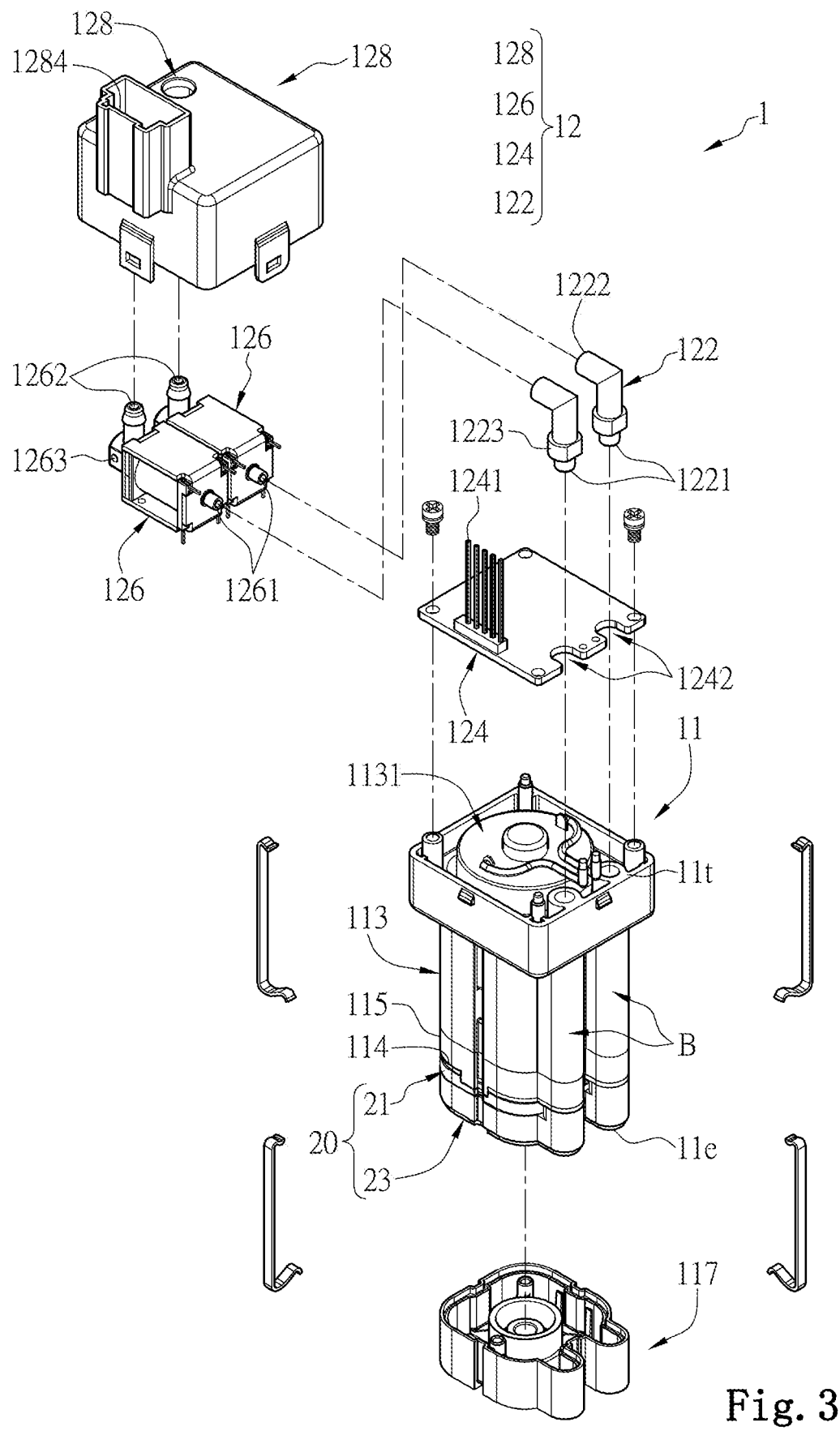
FIG. 3 is an explosive view of an embodiment of a pump and valve combination according to the present invention.

Refer to FIG. 2 and FIG. 3, a pump and valve combination 1 for bladder adjustment according to the present invention includes a fluid supply member 11, a valve member 12 and a bypass line B.

Figure 4:
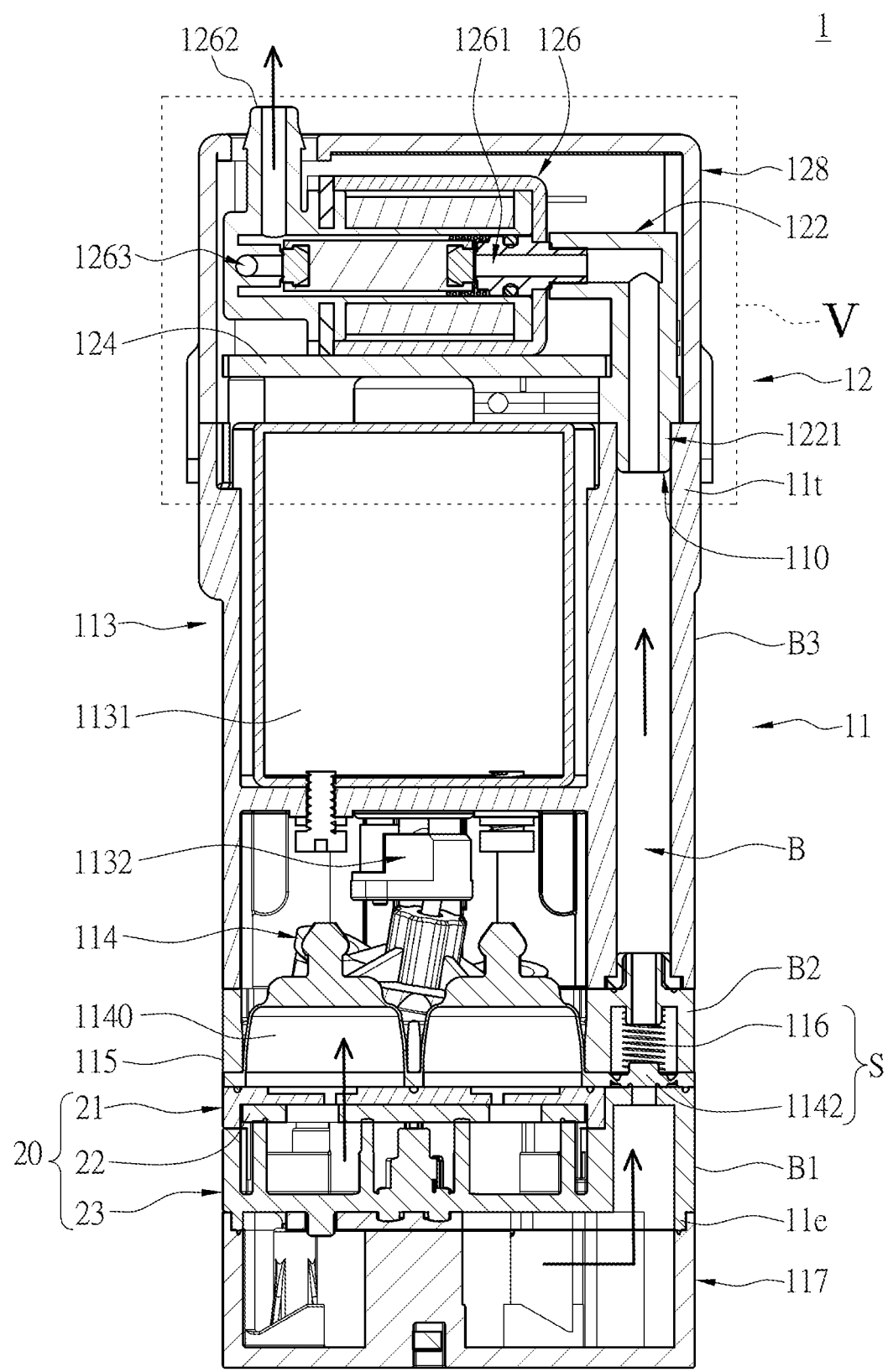
FIG. 4 is a sectional view of an embodiment of a pump and valve combination according to the present invention.

As shown in FIG. 3, the fluid supply member 11 includes a head end 11*t* and a tail end 11*e* opposite to the head end 11*t*. Refer to FIG. 3 and FIG. 4, the fluid supply member 11 further includes a driving member 113, a diaphragm member 114 and a bottom cover 117. The bottom cover 117 is disposed on the tail end 11*e* of the fluid supply member 11 and the fluid supply member 11 provides fluid to the bottom cover 117 through the tail end 11*e*. The driving member 113 consists of a motor 1131 fixed on the head end 11*t* of the fluid supply member 11 and a transmission part 1132. The diaphragm member 114 is arranged between the bottom cover 117 and the driving member 113.

Figure 5:
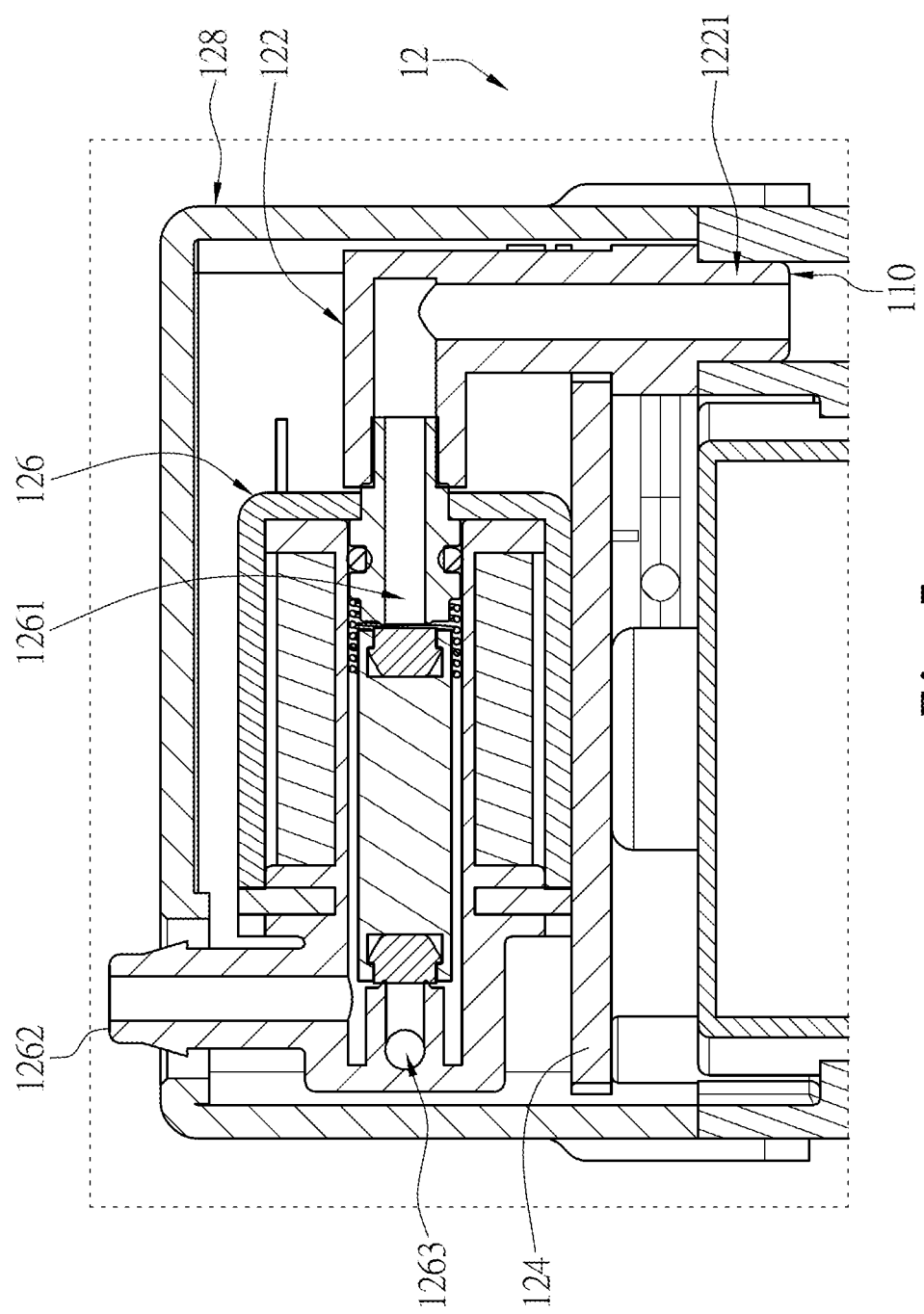
FIG. 5 is a partial sectional view of a valve member in an embodiment of a pump and valve combination according to the present invention.

As shown in FIG. 3, FIG. 4 and FIG. 5, the valve member 12 is arranged at the head end 11*t* of the fluid supply member 11 and is communicating with the bladder 2. The valve member 12 is composed of a valve cap 128, at least one solenoid operated directional control valve 126, and at least one air supply tube 122. The valve cap 128 is fixed on and connected to the head end 11*t* of the fluid supply member 11 while the solenoid operated directional control valve 126 and the air supply tube 122 are mounted in the valve cap 128.

In this embodiment, the valve member 12 of the pump and valve combination 1 includes a pair of solenoid operated directional control valves 126 and a pair of air supply tubes 122 while the fluid supply member 11 is provided with a pair of air supply ports 110. As shown in FIG. 4, the air supply ports 110 are located on the head end 11*t* of the fluid supply member 11 and connected to the air supply tubes 122, respectively. Thereby the two the air supply ports 110 can supply fluid to a pair of the bladders 2, respectively. The number of the solenoid operated directional control valve 126, the number of the air supply tube 122 and the number of the air supply port 110 are not limited.

As shown in FIG. 4, one end of the bypass line B is communicating with the bottom cover 117 while the other end thereof is extended to the valve member 12 and communicating with an air input end 1221 of the air supply tube 122. The bypass line B is located on one side of the motor 1131 and one side of the diaphragm member 114. An air output end 1222 of the air supply tube 122 is connected to an input portion 1261 of the solenoid operated directional control valve 126 while an output portion 1262 of the solenoid operated directional control valve 126 is connected to the bladder 2. Preferably, the bypass line B in this embodiment is integrally formed on an outer case of the fluid supply member 11 so as to simplify the assembly process. Yet the bypass line B can also be a tube connected between the bottom cover 117 of the fluid supply member 11 and the valve member 12 in other embodiments.

In this embodiment, the valve member 12 further includes an electronic control part 124 that is electrically connected to at least one solenoid operated directional control valve 126. The electronic control part 124 is also electrically connected to the fluid supply member 11 for control of the fluid supply member 11 to supply gas to the valve member 12. More specifically, the electronic control part 124 is electrically connected to the motor 1131 of the fluid supply member 11 for control of the motor 1131 of the fluid supply member 11.

The present invention has at least one advantage that the motor 1131 of the driving member 113 of the fluid supply member 11 is located close to the head end 11*t* of the fluid supply member 11. That means the motor 1131 is close to the electronic control part 124 of the valve member 12 so that the assembling process becomes more conveniently. Moreover, the fluid in the fluid supply member 11 is supplied and delivered from the tail end 11e to the bottom cover 117. Thus the fluid can be released from the fluid supply member 11 to the external environment outside the pump and valve combination 1 through the tail end 11e more conveniently for pressure adjustment and relief when the fluid pressure is too high.

In this embodiment, the solenoid operated directional control valve 126 can be a two-way three-position directional control valve. The solenoid operated directional control valve 126 further includes an adjustment outlet 1263 through which fluid in the bladder 2 is discharged to the atmosphere. Preferably, the adjustment outlet 1263 of the solenoid operated directional control valve 126 is arranged to be located in the valve cap 128. The fluid is flowing in the valve cap 128 of the valve member 12 and passed through an electromagnetic coil therein when the fluid (such as gas) is released from the bladder 2. Thereby the flowing of the fluid helps cool down the solenoid operated directional control valve 126.

In this embodiment, the solenoid operated directional control valve 126 is provided with an actuator for adjusting direction of the gas flow during the adjustment process mentioned above. The actuator can be a solenoid, a piezo element, etc. Moreover, the electronic control part 124 controls time and duration the power being supplied to the actuator of the solenoid operated directional control valve 126. The electronic control part 124 can provide additional functions. For example, the valve member 12 is provided with a pressure sensor for pressure measurement of the air in the bladder 2. The electronic control part 124 can be coupled to the pressure sensor for control of actuation of valves of the fluid supply member 11 and the valve member 12 according to the value of the pressure measured. The valve member 12 further includes a storage in which preset pressure settings or preset actuation modes are stored. The electronic control part 124 controls the fluid supply member 11 and the valve member 12 based on the preset pressure settings or preset actuation modes.

The valve cap 128 includes a pair of pipe holes 1282 and the output portion 1262 of the solenoid operated directional control valve 126 is exposed through the pipe hole 1282. The valve cap 128 is further provided with an electrical interface 1284 while the electronic control part 124 includes a terminal set 1241 which is used for receiving signals and located in the electrical interface 1284. The electronic control part 124 is disposed to respond to the signals received for control of the fluid supply member 11 and the valve member 12. The electronic control part 124 can be mounted in the valve member 12. Thus, the assembly process of the pump and valve combination 1 on the product can be simplified.

Besides, a stopping portion 1223 is formed around the air supply tube 122 in this embodiment. The stopping portion 1223 is projecting from the air supply tube 122 and arranged around the air supply port 110 of the fluid supply member 11.

At least one limiting slot 1242 is formed on the electronic control part 124 for limiting the air supply tube 122 therein. The stopping portion 1223 of the air supply tube 122 is set between the limiting slot 1242 and the air supply port 110 of the fluid supply member 11. Thereby the air supply tube 122 is fixed in the pump and valve combination 1 easily.

As shown in FIG. 4, the fluid supply member 11 further includes a holding case 115 for holding the diaphragm member 114 which is located between the driving member 113 and a fluid adjustment member 20. One end of the motor 1131 is close to the valve member 12 while the other end thereof drives the transmission part 1132. The diaphragm member 114 is opposite to the valve member 12, located on the other end of the motor 1131. Being driven by the motor 1131, the transmission part 1132 further drives the diaphragm member 114 so that the fluid is pumped and delivered into the bottom cover 117 by the diaphragm member 114.

The pump and valve combination 1 for bladder adjustment further includes a fluid adjustment member 20. The fluid pumped and delivered by the diaphragm member 114 passes through the fluid adjustment member 20 and flows into the bottom cover 117. The fluid adjustment member 20 is composed of a valve base 21, a valve 22 and an overpressure adjustment member 23. The valve base 21 controls the fluid flowing into a pump chamber 1140 of the diaphragm member 114 in a one-way manner. The valve 22 is arranged at one side of the valve base 21 for control of the fluid to flow from the pump chamber 1140 of the diaphragm member 114 into the overpressure adjustment member 23 in a one-way manner. When the fluid pressure is too high, the overpressure adjustment member 23 allows the fluid to flow through the middle of the valve 22 and the middle of the valve base 21 and return to the diaphragm member 114.

As shown in FIG. 4, at least one one-way valve plate 1142 extends from the periphery of the diaphragm member 114 of the fluid supply member 11 to the bypass line B.

Figure 6:
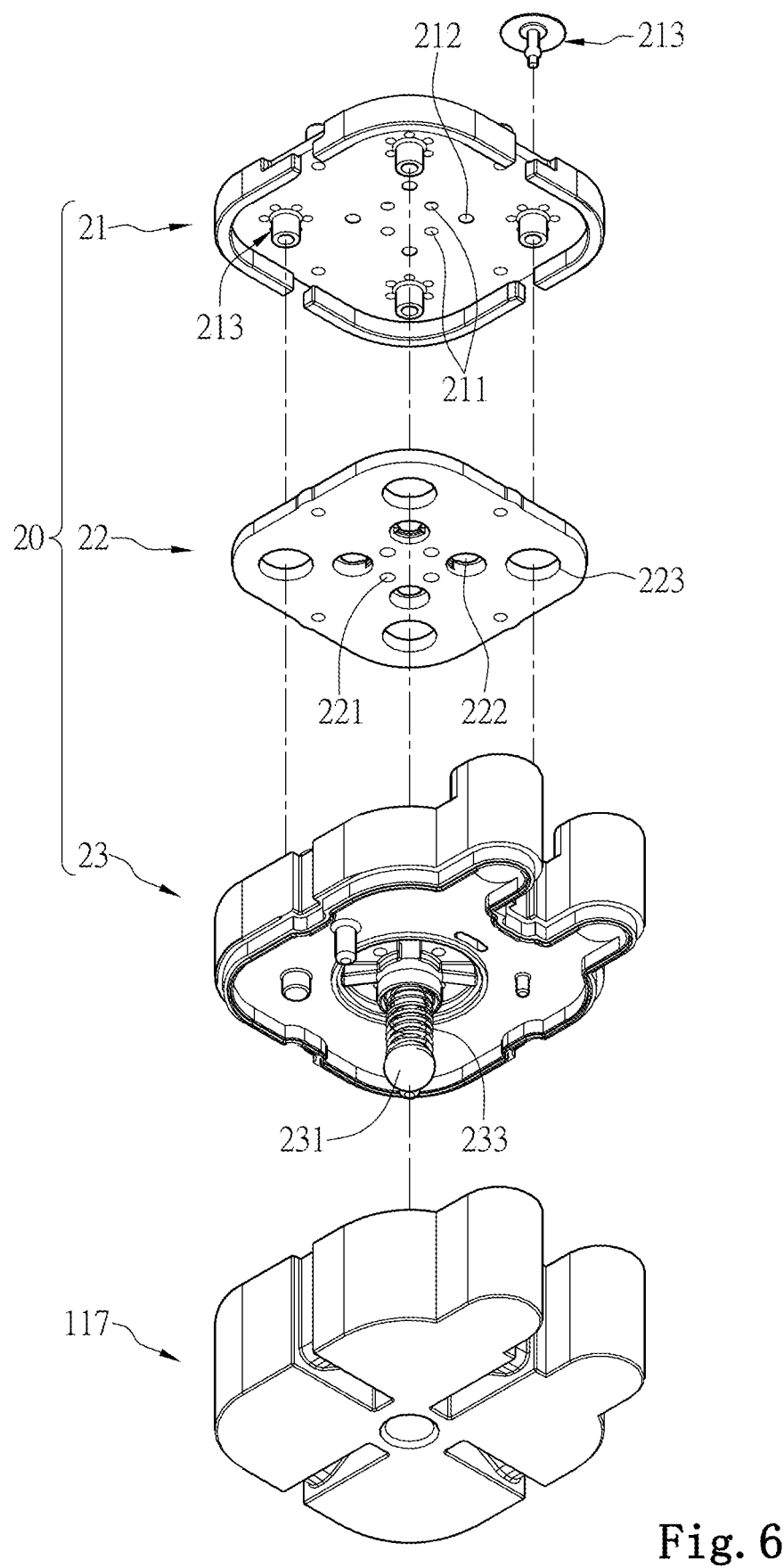
FIG. 6 is an explosive view of a fluid adjustment member and a bottom cover in an embodiment of a pump and valve combination according to the present invention.
Figure 7:
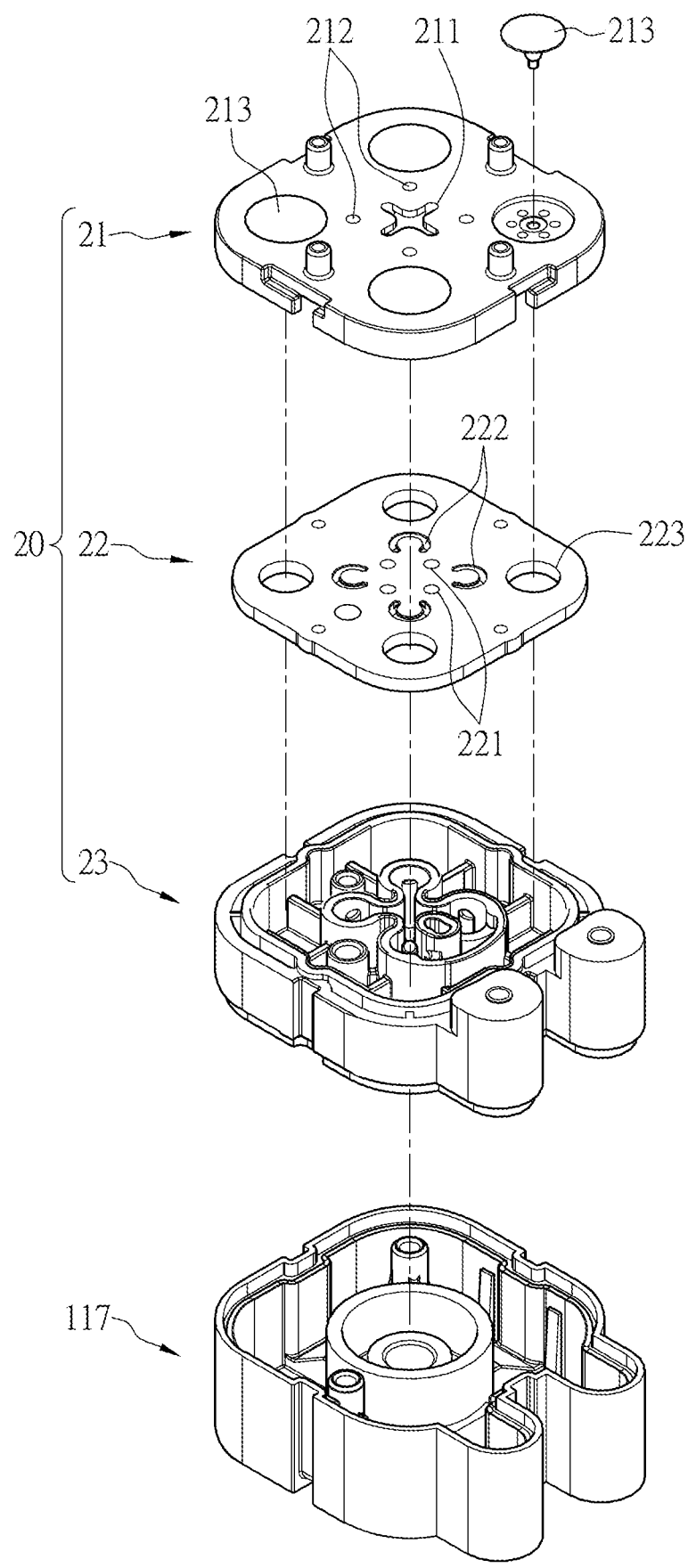
FIG. 7 is another explosive view of a fluid adjustment member and a bottom cover in an embodiment of a pump and valve combination according to the present invention.

Refer to FIG. 6 and FIG. 7, the valve base 21 consists of a plurality of upper adjustment holes 211, a plurality of fluid outlets 212 and a plurality of check valves 213. The upper adjustment holes 211 are located at the middle of the valve base 21 and the fluid outlets 212 are arranged around the upper adjustment holes 211 mentioned above while the check valves 213 are located around the fluid outlets 212.

The valve 22 is made from elastic material (such as rubber, plastic, etc.) and composed of a plurality of lower adjustment holes 221, a plurality of one-way valve pieces 222 and a plurality of outer through holes 223. The lower adjustment holes 221, the one-way valve pieces 222, and the outer through holes 223 are corresponding to and aligned with the upper adjustment holes 211, the fluid outlets 212 and the check valves 213 respectively.

The driving member 113 and the diaphragm member 114 of the fluid supply member 11 are used in combination with each other for pushing the fluid to flow through the fluid adjustment member 20 into the bottom cover 117 in a one-way manner. More specifically, firstly the fluid on the outer side is pumped and sucked by the diaphragm member 114 through the outer through holes 223 of the valve 22 and the check valves 213 of the valve base 21. Then the fluid is pushed by the diaphragm member 114 to flow through the fluid outlets 212 of the valve base 21, the one-way valve pieces 222 of the valve 22 and the overpressure adjustment member 23 and enter the bottom cover 117.

Refer to FIG. 4, the fluid into the bottom cover 117 is delivered to the valve member 12 through the bypass line B for being supplied to the bladder 2. More specifically, the bypass line B includes a lower pipe B1, a middle pipe B2 and an upper pipe B3. The lower pipe B1 is integrally formed on one side of the fluid adjustment member 20 and the middle pipe B2 is integrally formed on one side of the holding case 115 while the upper pipe B3 is integrally formed on one side of the driving member 113. Gas flows from the bottom cover 117 through the lower pipe B1, the middle pipe B2 and the upper pipe B3 to the air supply tube 122 of the valve member 12. In this embodiment, the bypass line B is further provided with a no-return part S which includes a spring 116 and a one-way valve plate 1142. The gas flows from the bottom cover 117 to the bypass line B in only one direction, without returning to the bottom cover 117. Preferably, one-way valve plate 1142 is formed by integral extension of the diaphragm member 114 to the lateral side in this embodiment.

Figure 8:
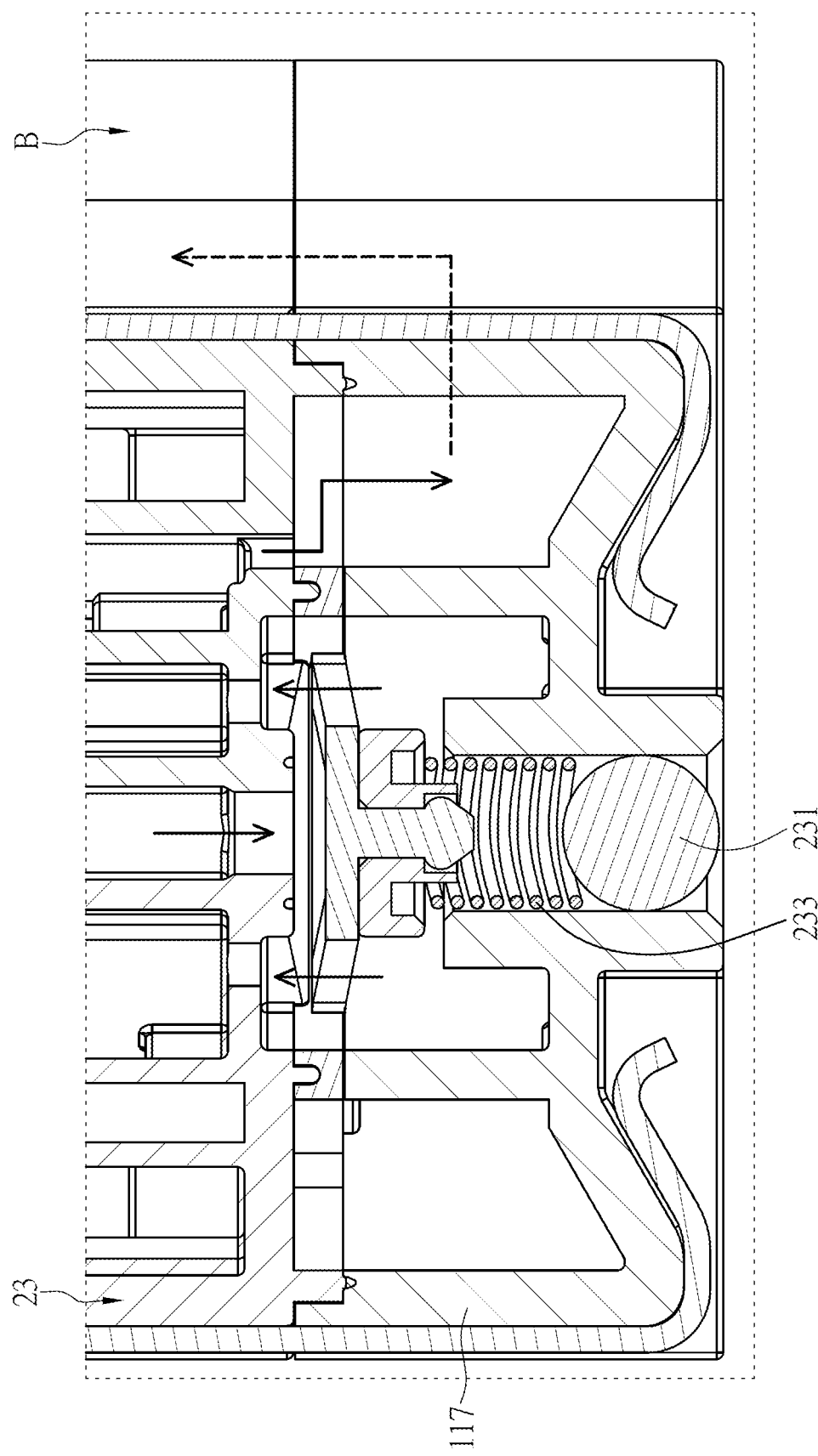
FIG. 8 is a partial sectional view of a fluid adjustment member in an embodiment of a pump and valve combination according to the present invention.

As shown in FIG. 8, a sectional along the central line of the bottom cover 117 is revealed. The overpressure adjustment member 23 consists of a stopper bead 231 and a spring 233. The stopper bead 231 is mounted in the bottom cover 117. When the pressure of the fluid in the bottom cover 117 is too high and over the preset spring force of the spring 233, the stopper bead 231 is pushed so that the fluid passes through the lower adjustment holes 221 of the valve 22 and the upper adjustment holes 211 of the valve base 21 and then flows back to the fluid supply member 11 for preventing overpressure that damages external components.

The fluid supply member 11 provides the fluid to the bottom cover 117 through the tail end 11e thereof so that the driving member 113 is getting closer to the electronic control part 124 and the assembly is easier. Moreover, the fluid is more convenient to be released from the fluid supply member 11 to the external environment outside the pump and valve combination 1 through the tail end 11e for pressure adjustment and relief when the fluid pressure is too high. A plurality of adjustable components is integrated into one pump and valve combination 1. Thus space required for installation is minimized and assembly cost is down.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A pump and valve combination for bladder adjustment comprising:
    a fluid supply member having
        a head end,
        a tail end opposite to the head end,
        a driving member including a motor fixed on the head end thereof and a transmission part,
        a bottom cover disposed on the tail end thereof, and
        a diaphragm member arranged between the bottom cover and the driving member while the transmission part driven by the motor further driving the diaphragm member so that fluid is pumped and delivered into the bottom cover by the diaphragm member;
    a valve member arranged at the head end of the fluid supply member and including
        a valve cap fixed on and connected to the head end of the fluid supply member,
        at least one solenoid operated directional control valve mounted in the valve cap, and
        at least one air supply tube mounted in the valve cap and communicating with a bladder; and
    a bypass line located on one side of the motor and one side of the diaphragm member and including one end thereof communicating with the bottom cover while the other end thereof is extended to the valve member;
    wherein one end of the motor is close to the valve member while the diaphragm member is on the other end of the motor, opposite to the valve member; the fluid pumped and delivered into the bottom cover by the diaphragm member passes through the bypass line to be supplied to the valve member; wherein the other end of the bypass line is communicating with an air input end of the air supply tube and an air output end of the air supply tube is connected to an input portion of the solenoid operated directional control valve while an output portion of the solenoid operated directional control valve is connected to the bladder.

2. The pump and valve combination as claimed in claim 1, wherein the pump and valve combination includes a pair of the solenoid operated directional control valves and a pair of the air supply tubes while the fluid supply member is provided with a pair of air supply ports.

3. The pump and valve combination as claimed in claim 1, wherein the valve cap includes at least one pipe hole through which the output portion of the solenoid operated directional control valve is exposed.

4. The pump and valve combination as claimed in claim 1, wherein the valve member further includes an electronic control part which is electrically connected to at least one solenoid operated directional control valve and is further electrically connected to the fluid supply member for control of the fluid supply member to supply gas to the valve member.

5. The pump and valve combination as claimed in claim 4, wherein the valve cap is further provided with an electrical interface and the electronic control part includes a terminal set which is located in the electrical interface.

6. The pump and valve combination as claimed in claim 4, wherein a stopping portion is formed around the air supply tube; the stopping portion is projecting from the air supply tube and arranged around the air supply port of the fluid supply member.

7. The pump and valve combination as claimed in claim 6, wherein at least one limiting slot is formed on the electronic control part for limiting the air supply tube therein and the stopping portion of the air supply tube is disposed between the limiting slot and the air supply port of the fluid supply member.

8. The pump and valve combination as claimed in claim 1, wherein the solenoid operated directional control valve is a two-way three-position directional control valve.

9. The pump and valve combination as claimed in claim 8, wherein the solenoid operated directional control valve further includes an adjustment outlet through which fluid in the bladder is discharged to the atmosphere.

10. The pump and valve combination as claimed in claim 9, wherein the adjustment outlet of the solenoid operated directional control valve is located in the valve cap.

11. The pump and valve combination as claimed in claim 1, wherein the pump and valve combination further includes a fluid adjustment member; the diaphragm member is located between the driving member and the fluid adjustment member; the fluid adjustment member includes a valve base, a valve and an overpressure adjustment member; the valve base controls the fluid flowing into a pump chamber of the diaphragm member in a one-way manner and the valve is set on one side of the valve base for control of the fluid to flow from the pump chamber of the diaphragm member into the overpressure adjustment member in only one direction; the overpressure adjustment member allows the fluid to flow through the middle of the valve and the middle of the valve base and return to the diaphragm member when the fluid pressure is too high.

12. The pump and valve combination as claimed in claim 11, wherein the valve base includes at least one upper adjustment hole, a plurality of fluid outlets and a plurality of check valves; the upper adjustment hole is located at the middle of the valve base and the fluid outlets are arranged around the upper adjustment hole while the check valves are located around the fluid outlets.

13. The pump and valve combination as claimed in claim 12, wherein the valve consists of at least one lower adjustment hole, a plurality of one-way valve pieces and a plurality of outer through holes; the lower adjustment hole, the one-way valve pieces, and the outer through holes are corresponding to the upper adjustment hole, the fluid outlets and the check valves respectively.

14. The pump and valve combination as claimed in claim 1, wherein at least one one-way valve plate extends from the periphery of the diaphragm member of the fluid supply member to the bypass line.

\* \* \* \* \*